Patented Mar. 17, 1936

2,034,521

UNITED STATES PATENT OFFICE 2,034,521

MANUFACTURE OF RUBBER ARTICLES

George Livings, Manchester, England, assignor to Dunlop Rubber Company Limited, Birmingham, England, a British corporation No Drawing. Application June 3, 1931, Serial No. 541,951. In Great Britain July 10, 1930

3 Claims. (Cl. 94—7)

This invention comprises improvements in or relating to the manufacture of goods of or containing rubber or similar material, particularly tiling or flooring.

It is the object of this invention to manufacture goods of or containing rubber or the like material, particularly flooring surfaces such as tiling or flooring, comprising the aforesaid materials bonded to compositions of sponge or similar cellular material of rubber or the like, utilizing in coating, backing or facing operations froth or foam of aqueous dispersions of the kinds hereinafter specified.

According to the invention the method for the manufacture of the aforesaid goods, particularly tiling or flooring of or containing rubber or the like material, comprising the aforesaid materials bonded to compositions of sponge or cellular materials of rubber or the like, comprises coating, backing or facing the aforesaid materials with froth or foam of aqueous dispersions of the kinds hereinafter specified and subsequently setting the coatings, backings or facings thereon.

Aqueous emulsions or dispersions which are converted into a frothy condition wherein the froth comprises a gas and the emulsions or dispersions aforesaid still in the reversible condition are employed for the purpose of this invention. The aforesaid froth can be caused to set, for instance, by heat, dehydrating action or coagulation to a permanent structure of irreversible solid material.

Alternatively, if desired, the aqueous emulsions or dispersions employed in this connection are or can be rendered capable of gelling on the application of heat, or substances can be added to cause the aqueous emulsions or dispersions to gel in the cold after a definite and controllable time interval.

The emulsions or dispersions comprise by way of example, those consisting of or containing rubber, gutta-percha, balata or similar vegetable resins, occurring naturally or artificially obtained and in vulcanized or unvulcanized condition and hereinafter generally termed "rubber material".

Aqueous dispersions of coagulated rubber, synthetic rubber, vulcanized rubber, waste or reclaim, may also be employed, if desired, as alternatives or admixtures.

Any of the aforesaid dispersions may contain the usual known compounding ingredients and/or may be in concentrated form.

Concentrates such as are obtained in Patent No. 1,846,164 of February 23, 1932, to which may be added any one or more of the usual compounding ingredients, preferably excepting those which would prevent the easy formation of a good lather or tend to lead to the breakdown of the froth or foam when such is produced, may also be used.

To the aforesaid aqueous dispersions frothforming substances are added if such are not already present in sufficient quantities. The aqueous dispersions employed are preferably concentrated and are converted into froth or foam by vigorous stirring, as for example, by the aid of paddles of the type used in cake-mixing machines.

The conditions must be such as to permit the formation of persistent lather capable of withstanding the conditions necessary for the subsequent conversion into an irreversible and solid structure. The foamy mass thus produced is spread or otherwise distributed uniformly on the surface of the tiling or flooring to be coated, backed or faced, which surfaces, if desired, are previously treated with some form of adhesive such as a rubber solution. In general, however, the presence of an adhesive is unnecessary.

The operation of spreading may be carried out in an ordinary spreading machine.

In the setting of the foam by the application of heat or setting solutions care must be taken that the temperature does not rise above the boiling point of water until the foam is irreversibly set.

Vulcanization must be effected before any pressure is brought to bear on the resulting sponge rubber, such as would occur, for instance, in the batching-up of the treated tiling.

Ultra-accelerators, are, therefore, particularly applicable in this connection to enable rapid vulcanization to be carried out, if desired, on the spreading machine.

In general, it is desirable to produce a fairly hard sponge rubber to back tiling. This hardness may be achieved by governing the conditions of frothing or by adjustment of the ingredients of the mixing.

The following examples illustrate how the invention can be effected:—

Example 1

A latex mixing which is to give a transparent product of the type described and claimed in British Patent No. 303,545, in the form of latex concentrate and having the following composition:—

| | Parts by weight |
|---|---|
| Rubber | 92 |
| Sulphur | 2.5 |
| Zinc diethyldithiocarbamate | 0.5 |
| Mineral oil | 5.0 | is prepared in the presence of 0.3 parts by weight of caustic potash and 0.5 parts by weight of oleic acid as described and claimed in Patent No. 1,846,164. The cream is whipped into a foam in any suitable manner, as for example, by means of an egg-whipping attachment of a cake-mixing machine. The foam produced in this manner is spread by known means to the required thickness on to the appropriate surface of rubber flooring or tiling, a guide at each side of the spreading machine being used to maintain the foam evenly to the required depth.

The vulcanization of the rubber flooring or tiling and the sponge rubber applied may proceed concurrently, thereby producing a uniform and satisfactory composite product.

An adhesive may be employed to intensify the union between the sponge and the flooring, but in general, this is unnecessary.

The setting of the spread foam is effected by the application of heat, the temperature not to exceed that of boiling water, or by spraying of coagulating solutions on to the surface of the sheet. The coagulating solution employed according to Patent 1,886,351, November 1, 1932 can also be used, that is one containing a coagulating agent such as acetic acid or a solution of an aluminum salt and a swelling agent such as benzene and an alcohol.

Example 2

A latex mixing similar to that employed in Example 1, is used, to which is added 0.5 parts of ammonium oleate and 1 part of sodium silicofluoride on the dry mix and the mixture thereafter whipped into a stiff froth in any suitable manner, for example, by means of an egg-whipping attachment of a cake-mixing machine.

The foam thus produced is now spread over a limited area of tiling, a sliding square enclosure being fitted on to this limited area for this purpose thereby permitting a uniform coating to be produced on this area. After the foam is set in the cold or by the application of heat the sliding square enclosure is placed on an adjacent section of tiling which is then treated in a similar manner, care being taken that the two adjacent portions when set are continuous.

The vulcanization may be carried out by known means. A limiting device is generally necessary in the spreading operation. In the absence of a limiting device the spread foam tends to move from its initial position and the predetermined constant depth is not maintained. Moreover, greater thicknesses of sponge backing may be obtained according to this example, if desired.

Having now particularly described and ascertained the nature of my said invention and in what manner the same is to be performed, I declare that what I claim is:

1. A method of making floor covering or surfacing material which comprises enclosing an area of a backing surface of unvulcanized rubber with a barrier of predetermined heighth, filling the enclosed area and leveling to the heighth of said barrier with a foamed rubber latex, and vulcanizing the resulting structure to form a unitary article.

2. A method of forming a floor covering or surfacing material which comprises enclosing an area of a backing of unvulcanized vulcanizable rubber with a barrier of predetermined heighth, filling the area to the heighth of said barrier with a foamed rubber latex, leveling said foamed latex to the heighth of said barrier, setting said foamed latex, removing said barrier and filling the uncovered area of said backing surface with foamed latex to the level of said set latex, and vulcanizing the resulting structure to form an integral article.

3. The method of claim 1 in which said backing is covered with a rubber cement before applying said foamed rubber latex.

GEORGE LIVINGS.